(12) United States Patent
Mustalahti et al.

(10) Patent No.: US 7,762,381 B2
(45) Date of Patent: Jul. 27, 2010

(54) TRAVELATOR CONVEYOR HAVING RELEASEABLY CONNECTED CONVEYOR MODULES AND METHOD FOR CONNECTING OR RELEASING SUCH CONVEYOR MODULES

(75) Inventors: Jorma Mustalahti, Hyinkää (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 128 days.

(21) Appl. No.: 11/633,019

(22) Filed: Dec. 4, 2006

(65) Prior Publication Data

US 2007/0074951 A1  Apr. 5, 2007

Related U.S. Application Data

(63) Continuation of application No. PCT/FI2005/000209, filed on May 9, 2005.

(30) Foreign Application Priority Data

Jun. 2, 2004  (FI) .................................. 20040757

(51) Int. Cl.
*B65G 13/00* (2006.01)
*B65G 47/31* (2006.01)
(52) U.S. Cl. .................. 198/321; 198/789; 198/334; 198/780; 198/792
(58) Field of Classification Search .................. 198/321, 198/334, 579, 792, 817
See application file for complete search history.

(56) References Cited

U.S. PATENT DOCUMENTS 1,689,201 A * 10/1928 Halter .................. 198/579

(Continued)

FOREIGN PATENT DOCUMENTS

CH  521 907 A  4/1972

(Continued)

OTHER PUBLICATIONS

International Search Report and Written Opinion Aug. 29, 2005, PCT/FI2005/000209 (filed Sep. 5, 2005).

*Primary Examiner*—Gene Crawford
*Assistant Examiner*—Kavel P Singh
(74) *Attorney, Agent, or Firm*—Venable LLP; Robert Kinberg; Ryan M. Flandro

(57) ABSTRACT

The conveyor of a travelator comprises a number of shafts and a number of mutually parallel endless belts. The conveyor comprises a number of conveyor modules successively connected to each other with a connecting section between them. The belts in the connecting section are arranged to be loosenable so that at least one shaft over which the belts to be loosened are passed is detachable so as to allow the conveyor modules to be released from each other. To release a conveyor module, at least one shaft on which the belt loops in the connecting section turn over is moved in relation to another shaft to slacken the belt loops. The shaft over which the loosened belt loops are passed is detached and removed from the belt loops. The detached conveyor module is removed for maintenance and/or replaced. In the assembly, a number of conveyor modules are provided, the conveyor modules are placed one after the other and connected to each other in the connecting section by belt loops and at least one detachably mounted shaft, which is placed in the belt loops in the connecting section. At least one of the shafts over which the belt loops in the connecting section are passed is moved to tighten the belt loops and to form a substantially continuous conveyor surface across the connecting section.

15 Claims, 3 Drawing Sheets

U.S. PATENT DOCUMENTS

| | | | | |
|---|---|---|---|---|
| 2,769,522 A | * | 11/1956 | Pfeiffer | 198/334 |
| 3,187,878 A | * | 6/1965 | Harrison et al. | 198/572 |
| 3,518,944 A | * | 7/1970 | Patin | 198/789 |
| 3,592,139 A | * | 7/1971 | Patin | 198/321 |
| 3,665,863 A | * | 5/1972 | Patin | 198/321 |
| 5,632,371 A | * | 5/1997 | Best et al. | 198/781.1 |
| 6,454,079 B1 | * | 9/2002 | Teramoto | 198/334 |

FOREIGN PATENT DOCUMENTS

| | | |
|---|---|---|
| FR | 1 583 906 A | 12/1969 |
| JP | 2003-020181 | 1/2003 |
| JP | 2003-327316 | 11/2003 |
| JP | 2003327316 | * 11/2003 |

* cited by examiner

TRAVELATOR CONVEYOR HAVING RELEASEABLY CONNECTED CONVEYOR MODULES AND METHOD FOR CONNECTING OR RELEASING SUCH CONVEYOR MODULES

CROSS REFERENCE TO RELATED APPLICATIONS

This application is a continuation of International Application No. PCT/FI2005/000209, filed May 9, 2005, which designated the United States and claims the priority benefit of Patent Application No. FI20040757, filed in Finland on Jun. 2, 2004, the priority of which is also claimed herein. The disclosures of the above-referenced applications are expressly incorporated herein by reference together with each U.S. and foreign patent and patent application mentioned below.

BACKGROUND

1. Field of the Invention

The present invention relates to a travelator including a conveyor for conveying people. Furthermore, the invention relates to a method for releasing a conveyor module of a travelator conveyor. In addition, the invention relates to a method of assembling a travelator conveyor.

2. Related Art

Travelators intended for transporting passengers are known, e.g. from Japanese patent document JP 2003-20181, U.S. Pat. No. 1,689,201, U.S. Pat. No. 2,769,522, and U.S. Pat. No. 3,592,139, each of which is incorporated herein by reference. In these, the conveyor includes a large number of adjacent narrow belts, several such belts being arranged over the width of the conveyor to transport users of the travelator. The conveyor has a large number of shafts, which are arranged parallel to each other, at a distance from each other and transversely to the transport direction of the conveyor. Connected to each shaft are a number of belt pulleys placed side by side. Further, the conveyor comprises a number of mutually parallel endless belts. The mutual arrangement of the belts is so implemented that they are interlaced with respect to each other in a comb-like fashion around each shaft. Each belt is passed over two belt pulleys on two successive shafts. Of each two closely adjacent belts on the same common shaft that are passed over adjacent belt pulleys, one belt is passed over a belt pulley on the previous shaft adjacent to the common shaft while the other belt adjacent to the aforesaid belt is passed over a belt pulley on the next shaft adjacent to the aforesaid common shaft. The belts may serve as power transmitting belts or the power transmission to the shafts may be implemented via external power transfer. The belts are tensioned e.g. by adjusting the distance between the shafts.

A problem with the prior-art construction is that the assembly of the travelator has to be started from the first shaft with the belts for that shaft already mounted on it and the next belts have to be placed between the previous ones before the next shaft is inserted into the belt loops and before the belts are tightened to their proper positions by adjusting the distance between the shafts. The assembly work advances from one end of the travelator to the other, producing a continuous structure, which, as the whole structure forms a single tensioned belt mat, can not be severed e.g. to allow replacement of a broken belt. A further problem is that this type of construction makes it necessary to carry out the entire assembly of the apparatus at the site of installation. In the case of a long conveyor (100 . . . 1000 m), installation and maintenance of the apparatus becomes unreasonably difficult.

SUMMARY

An object of the present invention is to overcome the above-mentioned drawbacks.

Another object of the invention is to disclose a travelator in which the assembly and maintenance at the site of installation will be easier and faster than before.

A further object of the invention is to disclose a method that will allow easy and fast detachment and replacement of a conveyor module in a travelator conveyor of modular construction.

A further object of the invention is to disclose a method that will allow easy and fast assembly of the conveyor of a travelator.

The above and other objects are achieved by a travelator conveyor, wherein according to one embodiment, the travelator conveyor comprises: a plurality of conveyor modules successively connected to one another, each conveyor module including: a plurality of module shafts arranged parallel to one another and at a distance from each adjacent module shaft transversely to a transport direction of the conveyor, wherein each module shaft includes a plurality of belt pulleys connected side by side; and a plurality of mutually parallel endless belts, each of said belts being passed over a belt pulley on two different module shafts, wherein a first belt and a second belt are positioned immediately adjacent to one another on a common module shaft, the first belt being passed over a belt pulley on a module shaft positioned before the common module shaft in the transport direction of the conveyor and the second belt being passed over a belt pulley on a module shaft positioned after the common module shaft in the transport direction of the conveyor; and a connecting section disposed between and connecting adjacent conveyor modules, the connecting section including at least one connecting shaft and a plurality of endless connecting belts, wherein at least one of the connecting belts is arranged to pass over the at least one connecting shaft and a module shaft disposed at an end of one of the adjacent conveyor modules and at least another one of the connecting belts is arranged to pass over the at least one connecting shaft and a module shaft disposed at an end of the other of the adjacent conveyor modules, wherein the at least one connecting shaft is movably arranged to allow loosening of at least one of the connecting belts and thereby allow adjacent conveyor modules to be released from one another.

According to a further embodiment of the invention, a travelator conveyor comprises a number of conveyor modules successively connected to each other with a connecting section between them where belts connect successive conveyor modules together so as to form a continuous conveyor across the connecting section. The belts in the connecting section are arranged to be loosenable so that at least one shaft over which the belts to be loosened are passed is detachable so as to allow the conveyor modules to be released from each other.

The invention has the advantage that it allows the conveyor to be divided into easy-to-handle conveyor modules of suitable length that can be pre-assembled at a factory as complete preliminary subassemblies, transported to the site of installation, and connected together one after the other at the site of installation to form a long travelator conveyor. The installation time of the conveyor is short. The modular construction of the conveyor is also very advantageous in respect of maintenance because if one of the modules is damaged, the module in question can be easily removed and replaced with a corresponding intact module and the travelator can be quickly restored to working order. The damaged module can be transported to a maintenance facility and repaired to operating condition again and the maintenance operation is no obstacle to the use of the travelator except during the replacement of the module. Thus, the idle time due to maintenance will be short. Deviations accumulated from length tolerances of the belts remain within the modules and are not accumulated across modules.

In another embodiment of the travelator, the connecting section contains two detachable shafts arranged to be movable towards and away from each other to slacken/tighten the belts passed over the detachable shafts. The belts at the conveyor module ends to be connected to each other, which belts are longer than the other belts of the conveyor module, are each passed over the two detachable shafts and a fixed shaft.

In yet a further embodiment of the travelator, the connecting section comprises one detachable shaft and two tensioning shafts, which are arranged at a different level relative to the level of the shafts of the conveyor module. The tensioning shafts are movable towards and away from the level of the shafts to slacken/tighten the belts. The belts at the conveyor module ends to be connected to each other, which belts are longer than the other belts of the conveyor module, are each passed over a fixed shaft at the end of the conveyor module, one tensioning shaft and the detachable shaft.

In a further embodiment of the travelator, the conveyor module has at one end a detachable shaft arranged to be movable in the direction of the plane of the shafts of the conveyor modules to slacken/tighten the belts passed over the detachable shaft so as to allow the detachable shaft to be detached. The connecting section contains one tensioning shaft, which is disposed at a different level relative to the level of the shafts of the conveyor module, and which tensioning shaft is movable towards and away from the level of the shafts to allow the belts in the connecting section passed over them to be loosened/tightened. The belts in the connecting section, which are longer than the other belts of the conveyor module, are each passed over a fixed shaft at the end of the conveyor module, the tensioning shaft and the detachable shaft.

In yet a further embodiment of the travelator, the travelator is a low-construction travelator designed to be mounted on a fixed base, such as a floor or other support.

In yet a further embodiment of the travelator, the travelator comprises an acceleration section for accelerating the passenger transport speed from a substantially slow initial speed to a heightened transport speed, a constant-speed section for conveying the passenger at a constant transport speed, and a deceleration section for decelerating the passenger transport speed from the constant transport speed to a decelerated final speed.

According to an embodiment of the method of the invention, a method is provided for releasing a conveyor module of a travelator conveyor, wherein according to one embodiment, the conveyor is assembled from a plurality of successively connected conveyor modules, each conveyor module including a plurality of module shafts arranged parallel to one another and a plurality of mutually parallel endless belts passed over two different module shafts, each conveyor module further being connected to an adjacent conveyor module by a connecting section, the connecting section including at least one connecting shaft and a plurality of endless connecting belts, the method comprising: moving the at least one connecting shaft relative to the module shafts to loosen at least one of the connecting belts; detaching and removing a detachable shaft over which the at least one loosened connecting belt is passed; removing the conveyor module from the conveyor to allow it to be serviced and/or replaced with another corresponding conveyor module.

According to an embodiment of the method of the invention, in each connecting section connecting a detachable conveyor module to an adjacent other conveyor module, at least one shaft on which the belt loops in the connecting section turn over is moved in relation to another shaft on which the aforesaid belt loops turn over so that the belt loops are loosened. To release the conveyor modules from each other, the shaft over which the loosened belt loops are passed is detached and removed from the belt loops. Finally, the detached conveyor module is removed for maintenance and/or to replace it with another corresponding conveyor module.

In a further embodiment of the method, two detachable shafts are arranged in the connecting section. Each belt loop in the connecting section is set over a fixed shaft at the end of the conveyor module, over a detachable shaft and over a detachable shaft between these. To release the conveyor modules from each other, the detachable shafts are moved towards each other to slacken the belts passed over them.

In yet a further embodiment of the method, one detachable shaft and two tensioning shafts are arranged in the connecting section. Each belt loop in the connecting section is passed over a fixed shaft at the end of the conveyor module, over one tensioning shaft and over the detachable shaft. To release the conveyor modules from each other, the tensioning shafts are moved so as to slacken the belt loops.

In yet a further embodiment of the method, a detachable shaft is arranged at the end of the conveyor module and a tensioning shaft is arranged in the connecting section. Each belt loop in the connecting section is passed over the detachable shaft at the end of the conveyor module, over a fixed shaft at the end of the adjacent conveyor module and over the tensioning shaft. To release the conveyor modules from each other, the detachable shaft is moved so as to slacken the belt loops passed over it and the tensioning shaft is moved so as to slacken the belt loops passed over it.

According to an embodiment of the method of the invention, a method is provided for the assembly of a travelator conveyor, wherein the method comprises: successively connecting a plurality of conveyor modules to one another with a connecting section, the connecting section including a plurality of endless connecting belts and at least one connecting shaft placed in at least one of the belts, each conveyor module having a length for forming part of a full transport length of the conveyor; and moving the at least one connecting shaft in the connecting section in a direction away from at least one detachably mounted shaft to tighten the connecting belts in the connecting section and to form a substantially continuous conveyor surface across the connecting section, wherein the at least one connecting shaft is a second detachably mounted shaft or a tensioning shaft.

According to the embodiments of the inventive method, in the assembly of the conveyor a number of conveyor modules are provided, the transport length of each of which forms part of the transport length of the entire conveyor. In other words, the conveyor is divided into independent sub-assemblies. The conveyor modules are placed one after the other and connected to each other in the connecting section by means of belt loops and at least one detachably mounted shaft, which is placed in the belt loops in the connecting section. At least one of the shafts over which the belt loops in the connecting section are passed is moved in a direction away from the detachably mounted shaft to tighten the belt loops in the connecting section and to form a substantially continuous conveyor surface across the connecting section.

BRIEF DESCRIPTION OF THE DRAWINGS

In the following, the invention will be described in detail with reference to embodiment examples and the attached drawing, wherein.

DETAILED DESCRIPTION

Figure 1:
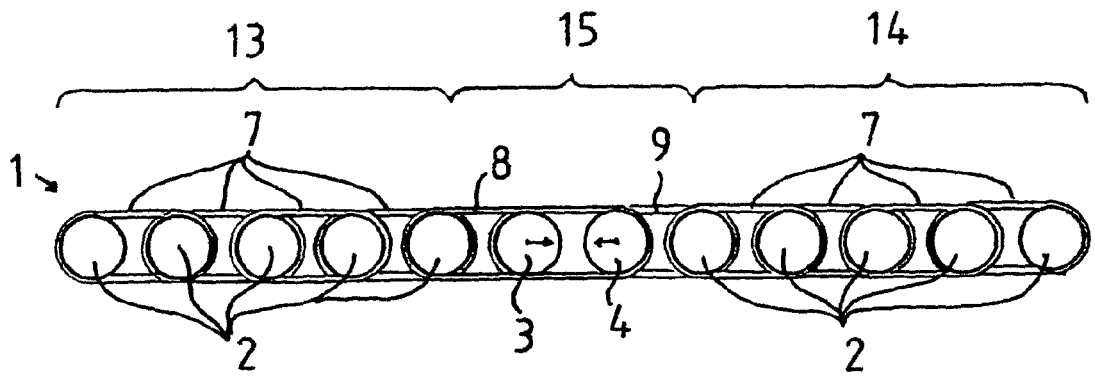
FIG. 1 presents a diagrammatic side view of a part of a first embodiment of the travelator of the invention, wherein two conveyor modules are connected together one after the other.
Figure 2:
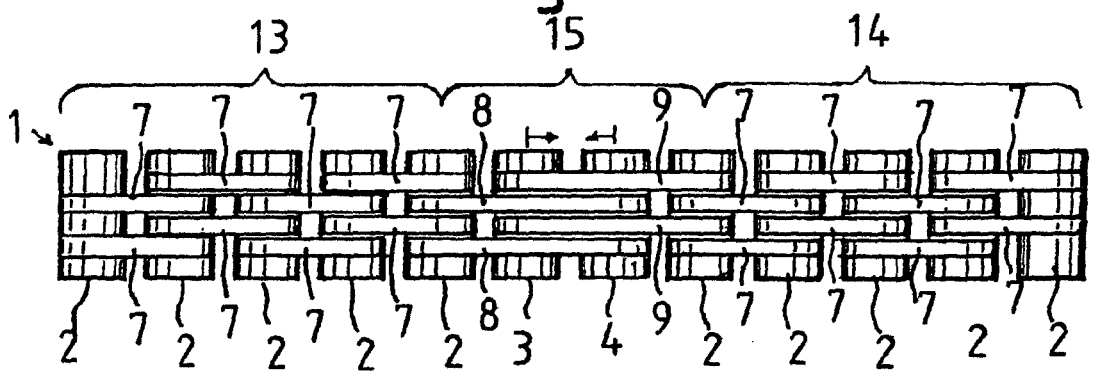
FIG. 2 presents a top view of the embodiment in FIG. 1.
Figure 3:
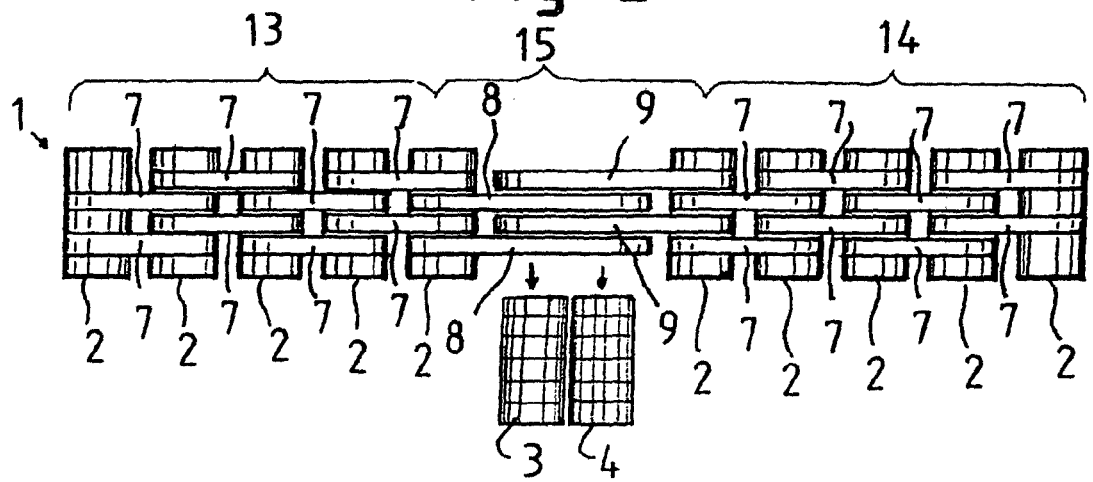
FIG. 3 presents the embodiment in FIGS. 1 and 2 with the conveyor modules detached from each other.

FIGS. 1-3 present a part of a travelator comprising a conveyor 1 for conveying passengers. The conveyor 1 comprises a number of shafts 2, 3, 4 so arranged that they are parallel to each other at a distance from each other and perpendicular the transport direction of the conveyor. Mounted side by side on each shaft 2, 3, 4 are a number of belt pulleys.

Belts 7, 8, 9 implemented as endless loops parallel to each other are arranged so that each belt is passed over two belt pulleys on two different successive shafts. As can be seen from the figures, the belts are interlaced so that, of each two closely adjacent belts on the same common shaft that are passed over adjacent belt pulleys, one belt is passed over a belt pulley on the previous shaft 2 adjacent to the common shaft 2 while the other belt is passed over a belt pulley on the next shaft 2 adjacent to the common shaft 2.

Although the example figures show that the belt is passed over two immediately successive shafts, it is naturally possible to use longer belt loops whose passage is so arranged that, between the shafts turning the belts around (180°), there are one or more supporting shafts with belt pulleys over which the belts run substantially straight without a change of direction, so the function of these shafts is only to support the belts from below.

The conveyor 1 includes a number of successive conveyor modules connected together one after the other, of which FIGS. 1-3 present two conveyor modules 13, 14. Between these is a connecting section 15, where the belts 8, 9 connect the successive conveyor modules 13, 14 to each other so that a continuous conveyor is formed across the connecting section 15. The belts in the connecting section 15 are arranged to be loosenable so that the two shafts 3 and 4 over which the belts 8, 9 to be loosened are passed can be detached so as to allow the conveyor modules 13, 14 to be detached from each other.

As stated above, the connecting section 15 of the embodiment in FIGS. 1-3 comprises two detachable shafts 3, 4, which have been arranged to be movable horizontally towards each other as indicated by arrows in FIG. 2 to allow the belts passed over the detachable shafts 3, 4 to be loosened. During assembly the belts 8, 9 are correspondingly tightened by moving the shafts away from each other. The belts 8, 9 at the conveyor module ends to be connected to each other are longer than the other belts 7 of the conveyor modules. Each belt 8 and 9 at the end of the conveyor module is passed over the two detachable shafts 3, 4 and a fixed shaft 2.

As can be seen from FIGS. 2 and 3, belts 9 can be loosened by moving the first detachable shaft 3 to the right, whereupon the shaft 3 can be pulled out in its longitudinal direction from between the belts 9. Similarly, by moving the second detachable shaft 4 to the left, belts 8 can be loosened, whereupon shaft 4 can be pulled out in its longitudinal direction from between the belts 8. Assembly is done in the reverse order.

Figure 4:
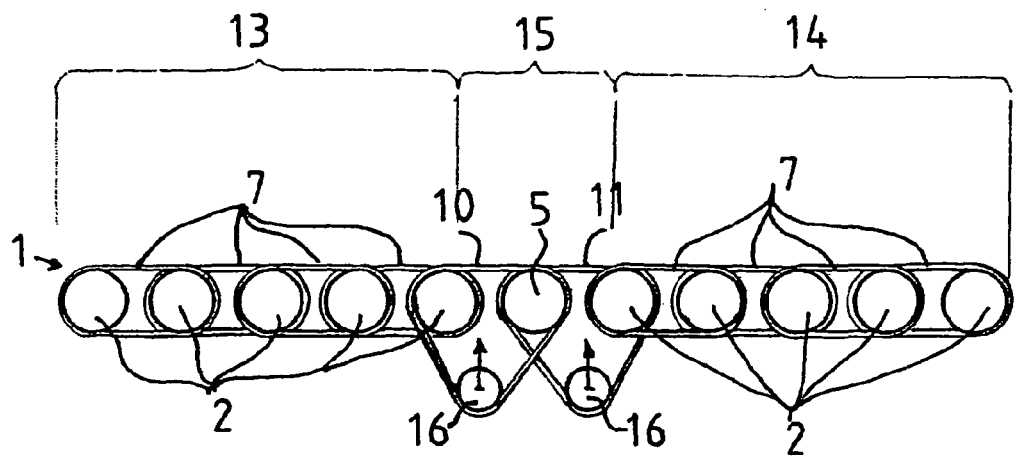
FIG. 4 presents a diagrammatic side view of a part of a second embodiment of the travelator of the invention, wherein two conveyor modules are connected together one after the other.
Figure 5:
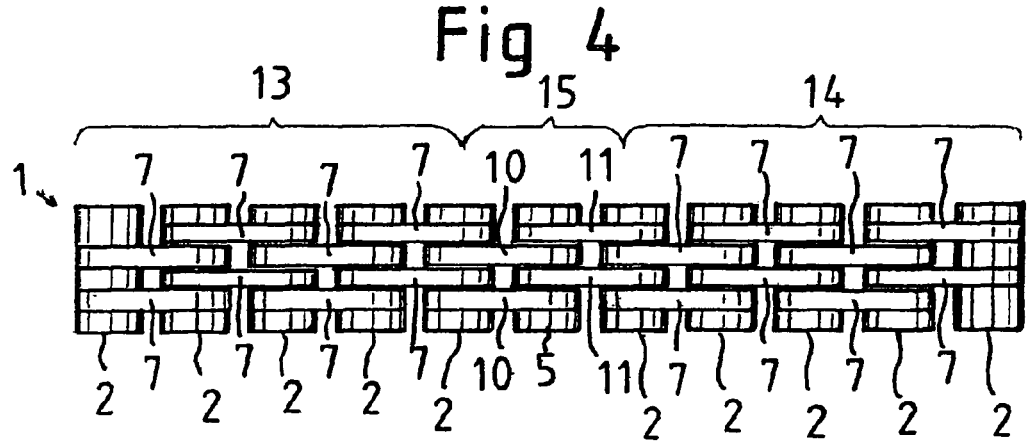
FIG. 5 presents a top view of the embodiment in FIG. 4.
Figure 6:
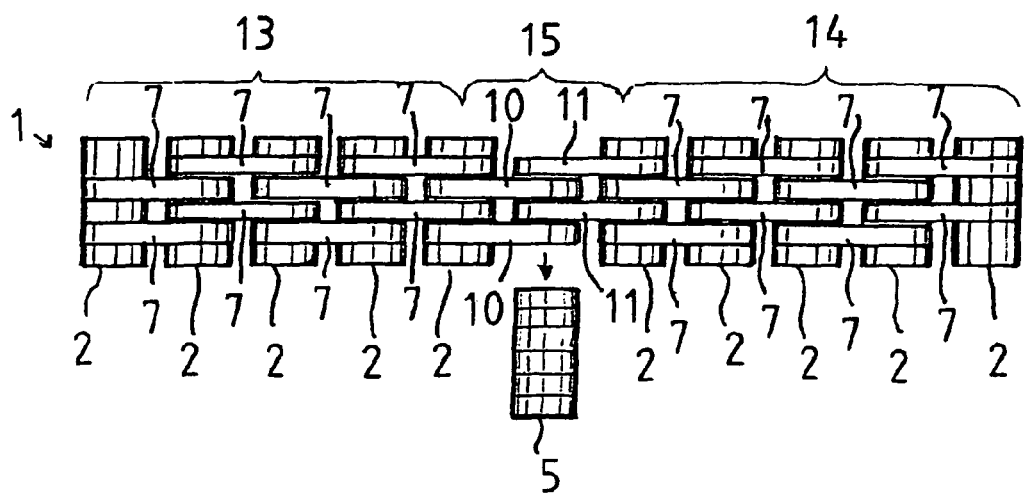
FIG. 6 presents the embodiment in FIGS. 4 and 5 with the conveyor modules detached from each other.

FIGS. 4-6 present an embodiment in which the construction of the conveyor modules 13, 14 corresponds to the embodiment in FIGS. 1-3 but differs from it in respect of the arrangement in the connecting section 15.

The connecting section 15 comprises one detachable shaft 5 and two tensioning shafts 16. The tensioning shafts 16 are disposed at a different level relative to the level of the shafts 2 of the conveyor module 13, 14, in this example below the level of the shafts 2. The tensioning shafts 16 can be moved upwards towards the level of shafts 2 to slacken the belts 10 and 11. Correspondingly, the belts 10 and 11 are tightened by moving the tensioning shafts 16 downwards away from the level of shafts 2. The belts 10, 11 at the ends of conveyor modules 13, 14 to be connected together are longer than the other belts 7 of the conveyor module. Belts 10 are passed over the fixed shaft 2 at the end of conveyor module 13, one tensioning shaft 16 and the detachable shaft 5. Similarly, belt 11 is passed over the fixed shaft 2 at the end of conveyor module 14, one tensioning shaft 16 and the detachable shaft 5.

By moving the tensioning shafts 16 vertically, the belts 10 and 11 in the connecting section 15 can be loosened, the shaft 5 in the middle can be removed as shown in FIG. 5, and the modules 13 and 14 can be separated from each other.

Figure 7:
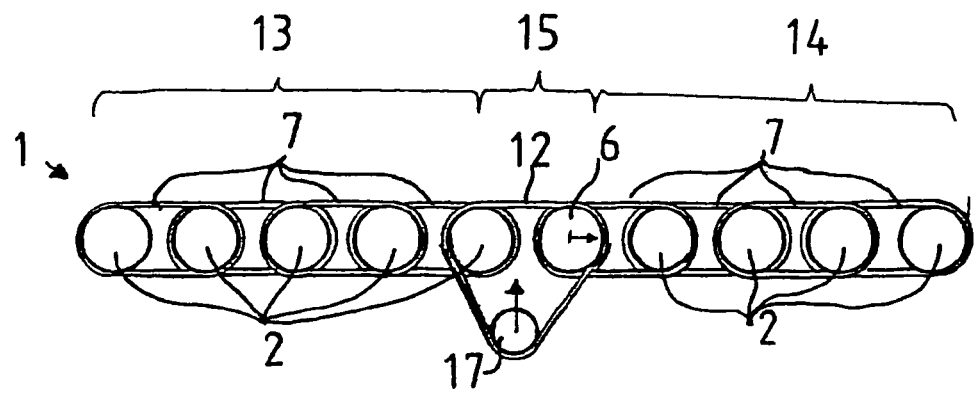
FIG. 7 presents a diagrammatic side view of a part of a third embodiment of the travelator of the invention, wherein two conveyor modules are connected together one after the other.
Figure 8:
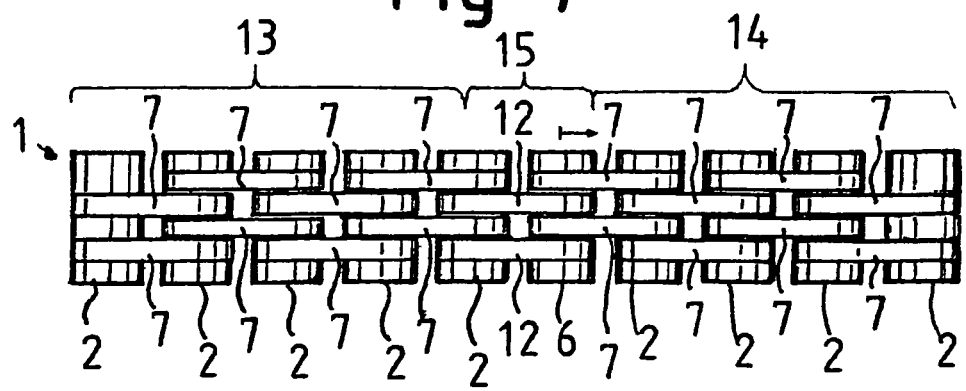
FIG. 8 presents a top view of the embodiment in FIG. 7.
Figure 9:
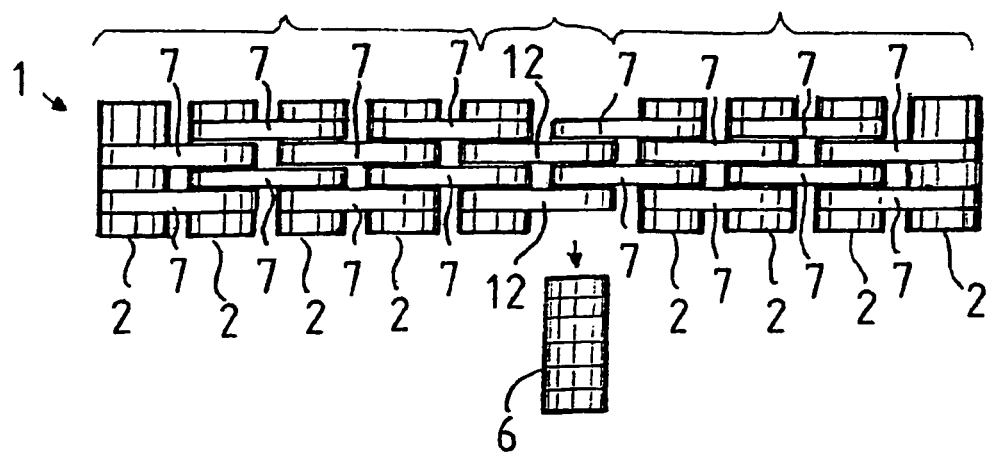
FIG. 9 presents the embodiment in FIGS. 7 and 8 with the conveyor modules detached from each other.

FIGS. 7-9 present yet another embodiment, in which the conveyor module 14 has a detachable shaft 6 at the end adjacent to the connecting section 15. This shaft 6 has been arranged to be movable in the direction of the plane of the shafts 2 of the conveyor modules 13, 14, i.e. horizontally, to allow the belts 7 passed over the detachable shaft 6 to be loosened so that the detachable shaft 6 can be released.

The connecting section 15 contains one tensioning shaft 17, which is disposed at a different level relative to the level of the shafts 2 of the conveyor module, in this case below the level of the shafts 2. The tensioning shaft 17 can be moved vertically towards the level of shafts 2 to allow the belts 12 of the connecting section 15 that are passed over them to be loosened. During assembly, tensioning is performed in the reverse order. The belts 12 in the connecting section are longer than the other belts 7 of the conveyor module. Each belt 12 in the connecting section 15 is passed over the fixed shaft 2 at the end of the conveyor module 13, over the tensioning shaft 17 and over the detachable shaft 6.

By moving the tensioning shaft 17 upwards, the belts 12 in the connecting section can be loosened, whereupon, by moving the shaft 6 in module 14 that is adjacent to the connecting section 15, the belts 12 passed over it can be loosened and the shaft 6 released, thus disconnecting the modules.

After the detachment, the modules 13, 14 can be replaced and serviced.

For the sake of clarity, the skeleton diagrams portrayed in FIGS. 1-9 present only two modules connected together at one end. A practical travelator, which may have a length of 100 . . . 1000 m, may comprise 25 . . . 250 modules of a length of 4 m connected together one after the other. For the sake of clarity, FIGS. 1-9 show only a small number of belts 7, 8, 9, 10, 11, 12. A practical embodiment of the travelator with a belt width of about 5 mm has 100 adjacent belts across the width of the travelator. Further, in practice the conveyor module 13, 14 contains a larger number of shafts 2 than the number presented in FIGS. 1-9. While FIGS. 1-9 show only 4-5 shafts 2 in each module, a 4 m long conveyor module in a practical example embodiment contains 32 shafts when the belt pulleys on the shafts 2 have a diameter of 10 cm and the shafts are arranged at intervals of 12.5 cm.

In one embodiment, the travelator constructed from conveyor modules is a low-construction travelator designed to be mounted on a fixed base, such as a floor or other support, which may comprise accelerating, constant speed and/or decelerating sections as described in co-owned U.S. National Stage application Ser. No. 11/440,997, filed May 26, 2006 (based on International Application No. PCT/FI2004/000661, filed Nov. 9, 2004, and published Sep. 21, 2006, as U.S. Patent Application Publication No. 2006/0207857 A1), and which is hereby incorporated by reference.

The invention is not limited to the embodiment examples described above; instead, many variations are possible within the scope of the inventive concept defined in the claims.

The invention claimed is:

1. A travelator conveyor, comprising:
   a plurality of pre-assembled conveyor modules successively connected to one another, each conveyor module defining a removable and replaceable subassembly including:
      a plurality of module shafts arranged parallel to one another and at a distance from each adjacent module shaft, wherein each module shaft extends transversely to a transport direction of the conveyor and includes a plurality of belt pulleys connected side by side; and
      a plurality of mutually parallel endless belts, each of said belts being turned over a belt pulley on two different module shafts, wherein a first belt and a second belt positioned immediately adjacent to one another on a common module shaft turn over belt pulleys on the common module shaft, and wherein the first belt turns over a belt pulley on a module shaft positioned before the common module shaft in the transport direction of the conveyor and the second belt turns over a belt pulley on a module shaft positioned after the common module shaft in the transport direction of the conveyor; and
   a connecting section disposed between and connecting adjacent conveyor modules, the connecting section including at least one connecting shaft and a plurality of endless connecting belts, wherein at least one of the connecting belts turns over the at least one connecting shaft and a module shaft disposed at an end of one of the adjacent conveyor modules, wherein at least another one of the connecting belts turns over the at least one connecting shaft and a module shaft disposed at an end of the other of the adjacent conveyor modules, and wherein the at least one connecting shaft is movably arranged to allow loosening of at least one of the connecting belts and thereby allow adjacent conveyor modules to be released from one another.

2. The travelator conveyor according to claim 1, wherein the at least one connecting shaft in the connecting section includes two detachable shafts arranged to be movable towards and away from one another to slacken/tighten each connecting belt turned over the two detachable shafts.

3. The travelator conveyor according to claim 2, wherein each connecting belt is turned over at least one of the two detachable shafts and at least one of the module shafts disposed at the ends of the adjacent conveyor modules.

4. The travelator conveyor according to claim 1, wherein each connecting belt is longer than each of the plurality of mutually parallel endless belts in the conveyor modules.

5. The travelator conveyor according to claim 1, wherein the at least one connecting shaft in the connecting section includes a detachable shaft and two tensioning shafts, the two tensioning shafts being disposed at a different level relative to a level defined by the plurality of module shafts of each adjacent conveyor module, wherein the two tensioning shafts are movable towards/away from the level of the module shafts to allow the connecting belts to be loosened/tightened, and wherein each connecting belt is turned over the detachable shaft, one of the tensioning shafts, and at least one of the module shafts disposed at the ends of the adjacent conveyor modules.

6. The travelator conveyor according to claim 1, wherein the module shafts of each conveyor module include a detachable shaft at one end thereof, the detachable shaft being arranged to be movable in a direction parallel to the transport direction of the conveyor module to slacken/tighten the plurality of mutually parallel endless belts turned over the detachable shaft to allow the detachable shaft to be detached, and wherein the at least one connecting shaft of the connecting section is a tensioning shaft disposed at a different level relative to a plane defined by the module shafts of each adjacent conveyor module, the tensioning shaft being movable towards/away from the plane of the module shafts to allow the connecting belts to be loosened/tightened.

7. The travelator conveyor according to claim 6, wherein each connecting belt is longer than each of the plurality of mutually parallel endless belts and each connecting belt is turned over the detachable shaft of one of the adjacent conveyor modules, the tensioning shaft, and the module shaft disposed at an end of the other adjacent conveyor module.

8. The travelator conveyor according to claim 1, wherein the travelator is a low-construction travelator designed to be mounted on a fixed base, such as a floor or other support.

9. The travelator conveyor according to claim 1, further comprising
   an acceleration section for accelerating a passenger transport speed from a substantially slow initial speed to a heightened transport speed,
   a constant-speed section for conveying people at a constant transport speed, and
   a deceleration section for decelerating the passenger transport speed from the constant transport speed to a decelerated final speed.

10. A method for releasing a pre-assembled conveyor module of a travelator conveyor wherein the conveyor is assembled from a plurality of successively connected pre-assembled conveyor modules, each conveyor module defining a removable and replaceable subassembly including a plurality of module shafts arranged parallel to one another and a plurality of mutually parallel endless belts turned over two different module shafts, each conveyor module further being connected to an adjacent conveyor module by a connecting section, the connecting section including at least one connecting shaft and a plurality of endless connecting belts, the method comprising:
   moving the at least one connecting shaft relative to the module shafts to loosen at least one of the connecting belts;
   detaching and removing a detachable shaft over which the at least one loosened connecting belt is turned; and removing the conveyor module from the conveyor to allow the conveyor module to be serviced and replaced with another corresponding conveyor module.

11. The method according to claim 10, wherein the at least one connecting shaft comprises the detachable shaft and another detachable shaft, and wherein each of the connecting belts are turned over one of the two detachable shafts and a module shaft disposed at an end of one of the adjacent conveyor modules, wherein the moving comprises moving the two detachable shafts towards each other to slacken each connecting belt.

12. The method according to claim 10, wherein the at least one connecting shaft includes the detachable shaft and two tensioning shafts, and wherein the connecting belts in the connecting section are turned over the detachable shaft, one of the tensioning shafts, and a module shaft disposed at an end of one of the adjacent conveyor modules, wherein the moving comprises moving each of the tensioning shafts toward a plane defined by the module shafts so as to slacken the connecting belts.

13. The method according to claim 10, wherein the module shafts of each conveyor module include the detachable shaft at one end thereof, the detachable shaft being arranged to be movable in a direction parallel to the transport direction of the conveyor module to slacken/tighten the plurality of mutually parallel endless belts turned over the detachable shaft to allow the detachable shaft to be detached, and wherein the at least one connecting shaft of the connecting section is a tensioning shaft disposed at a different level relative to a plane defined by the module shafts of each adjacent conveyor module, the tensioning shaft being movable towards/away from the plane of the module shafts to allow the connecting belts to be loosened/tightened, wherein the moving comprises moving the detachable shaft to slacken the plurality of mutually parallel endless belts turned over the detachable shaft.

14. A method for the assembly of a travelator conveyor, the method comprising:

successively connecting a plurality of pre-assembled conveyor modules to one another with a connecting section, the connecting section including a plurality of endless connecting belts and at least one connecting shaft placed in at least one of the belts, each conveyor module defining a removable and replaceable subassembly having a length for forming part of a full transport length of the conveyor; and moving the at least one connecting shaft in the connecting section in a direction away from at least one detachably mounted shaft to tighten the connecting belts in the connecting section and to form a substantially continuous conveyor surface across the connecting section, wherein the at least one connecting shaft is a second detachably mounted shaft or a tensioning shaft.

15. The method for the assembly of a travelator conveyor according to claim 14, wherein each pre-assembled conveyor module includes:

a plurality of module shafts arranged parallel to one another and at a distance from each adjacent module shaft, wherein each module shaft extends transversely to a transport direction of the conveyor and includes a plurality of belt pulleys connected side by side; and a plurality of mutually parallel endless belts, each of said belts being turned over a belt pulley on two different module shafts, wherein a first belt and a second belt positioned immediately adjacent to one another on a common module shaft turn over belt pulleys on the common module shaft, and wherein the first belt turns over a belt pulley on a module shaft positioned before the common module shaft in the transport direction of the conveyor and the second belt turns over a belt pulley on a module shaft positioned after the common module shaft in the transport direction of the conveyor, and wherein when the plurality of pre-assembled conveyor modules are successively connected to one another with the connecting section, at least one of the connecting belts turns over the at least one connecting shaft and a module shaft disposed at an end of one of the adjacent conveyor modules and at least another one of the connecting belts turns over the at least one connecting shaft and a module shaft disposed at an end of the other of the adjacent conveyor modules.

* * * * *